THOMAS J. RYAN
INVENTOR.

BY *T. M. Phillips*
*J. M. St. Amand*
ATTORNEYS

United States Patent Office 3,267,449
Patented August 16, 1966

3,267,449
TELEMETERING SYSTEM WITH AUTOMATIC SCAN FOR MONITORING PLURAL INPUTS
Thomas J. Ryan, Buckingham, Pa., assignor, by mesne assignments, to the United States of America as represented by the Secretary of the Navy
Filed Oct. 9, 1962, Ser. No. 229,506
5 Claims. (Cl. 340—213)

The present invention relates to telemetering systems and more particularly to telemetering systems having commanded multiplexing.

In known systems where multichannel information is to be telemetered, i.e., one wide-band intelligence, one continuous function and a multiple of direct current function; two transmitters would be required, one for wide-band and the other having some form of multiplexing (SCO, FM-FM). The present invention allows the above information to be transmitted on only one transmitter. This is accomplished by a commanded commutator. The commutator rests on the "home" position which connects the wide-band signal to a mixer. The continuous signal channel (having command pulses) is at all times added to the output of the commutator. Mixer output feeds the transmitter. During the period of flight test just following the time when pertinent information on the wide-band channel mixed with the continuous signal has been transmitted, the command to commutate is recognized and the commutator is commanded to take a sample of each of the multiple direct current functions and then returns to home position to await the next command.

An object of the present invention is to provide a telemetering system which allows continuous, wide-band and multiple channels information to be transmitted on a single transmitter.

Another object of the invention is to provide a telemetering system which will transmit one wide-band, one continuous and a multiple direct current function on only one transmitter by the selected use of the signals with respect to time.

Other objects and many of the attendant advantages of this invention will become readily appreciated as the same becomes better understood by reference to the following detailed description when considered in connection with the accompanying drawings wherein.

Figure 1:
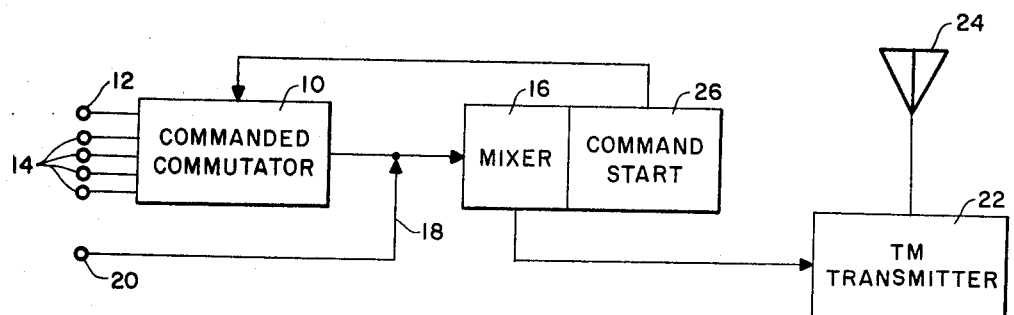
FIG. 1 is a block diagram of a preferred embodiment of the invention.

Referring now to the drawings, wherein like reference characters designate like or corresponding parts throughout the several views, there is shown in FIG. 1 a commanded commutator 10 having a wide-band input at terminal 12 such as high frequency signals, i.e., target signatures, and multiple direct current inputs at terminals 14 which may be inputs from temperature, air velocity and stress measuring instruments. The output of commutator 10 is coupled to the input of mixer 16 where it is mixed with a continuous signal fed into mixer 16 by lead 18 from terminal 20. In guided missile flight testing it is desirable to have the fuze information continuously transmitted. As each step is performed in the functioning of the fuze system, a pulse signal is generated and fed to mixer 16 through terminal 20. The combined output signal of mixer 16 which contains the command signal is coupled to transmitter 22 for transmission by antenna 24. The command signal is detected by command start circuit 26 and fed to commutator 10 to cause it to commutate at the proper time.

Figure 2:
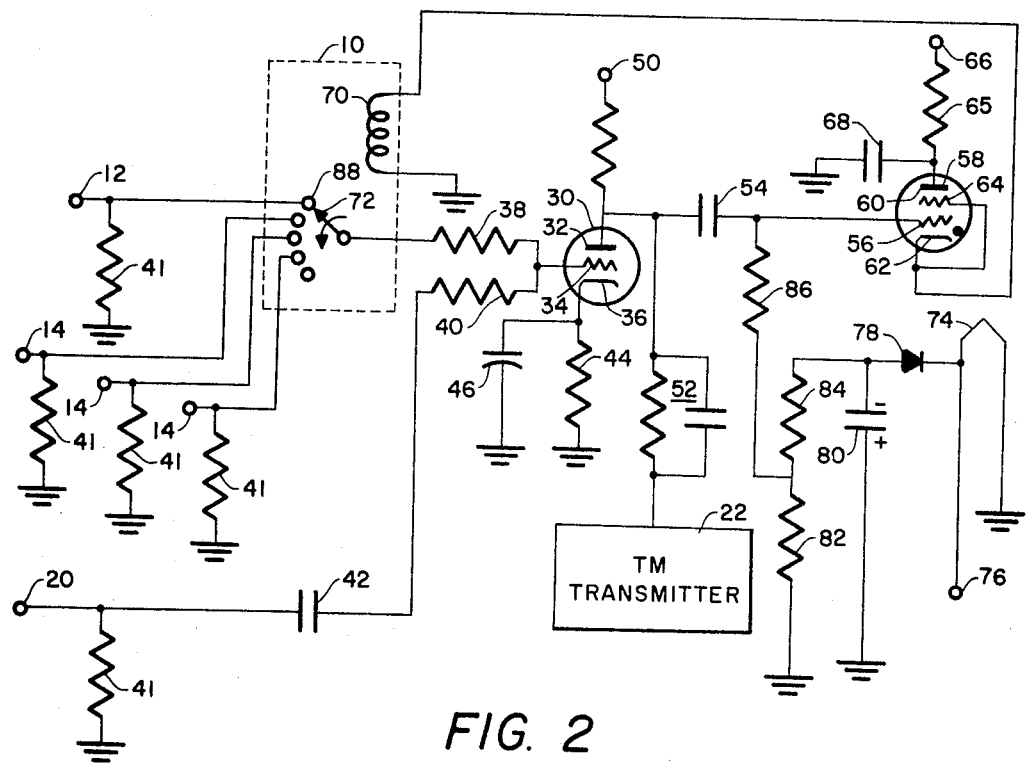
FIG. 2 is a schematic diagram of the signal mixer and command unit of FIG. 1.

Referring now to FIG. 2, mixer 16 comprises a triode vacuum tube 30, having an anode 32, control grid 34 and cathode 36. The inputs to control grid 34 is fed through an adding circuit comprising resistors 38 and 40. The output of commutator 10 is fed through resistor 38 while the input at terminal 20 is coupled through coupling capacitor 42 and fed through resistor 40. Each of terminals 12, 14 and 20 are provided with padding resistors 41. Resistor 44 and capacitor 46 are connected to cathode 36 to provide bias for the proper operation of tube 30. B+ voltage is supplied through anode resistor 48 from terminal 50 of a B+ source (not shown). The output of mixer 16 is coupled through filter network 52 to transmitter 22 and also coupled through capacitor 54 to control grid 56 of gas tube 58 which includes an anode 60, cathode 62 and screen grid 64. Anode 60 is connected through resistor 65 to terminal 66 of B+ supply and through capacitor 68 to ground. The load for gas tube 58 is starting coil 70 of commutator 10. The motor for driving selector arm 72 is preferably of the spring-driven type and is released from its rest position and permitted to rotate in a counterclockwise direction to successively connect the remainder of the multiple D.C. inputs to mixer circuit 16. Filament heater 74 for cathode 62 is supplied from a standard source (not shown) of 6.3 alternating current at terminal 76. Grid bias for grid 56 is supplied by rectifier 78 and bias network consisting of capacitor 80, and resistors 82, 84 and 86.

In operation, commutator 72 rests in the home position, resting on contact 88 which is connected to terminal 12 and completes the circuit for the wide-band signal to the input of mixer tube 30. The continuous channel through which the command pulses are fed is continuously connected to tube 30 so that it is at all times added to the output of commutator 10. Tube 58 is biased so that it will fire when a command pulse is superimposed on the output of tube 30. When a command pulse is received at tube 58, a command starting pulse is discharged through coil 70 which releases arm 72 which takes a sample of each of the D.C. functions, and then returns to contact 88 to await the next command.

Obviously many modifications and variations of the present invention are possible in the light of the above teachings. It is therefore to be understood that within the scope of the appended claims the invention may be practiced otherwise than as specifically described.

What is claimed is:
1. In a commanded multiplexing telemetering system, the combination comprising:
    (a) multiple sources of signals containing information to be transmitted,
    (b) mixer circuit means having one of said sources continuously coupled as an input thereto,
    (c) commutator circuit means having a rotating selector member for successively coupling a plurality of said multiple sources to said mixer circuit when actuated by a command pulse from said source that is continuously coupled to said mixer circuit, and
    (d) transmitter means being coupled to the output of said mixer circuit means for transmitting the information received from said multiple sources.
2. In a commanded multiplexing telemetering system, the combination comprising:
    (a) multiple sources of signals containing information to be transmitted,
    (b) mixer circuit means having one of said sources continuously coupled as an input thereto,
    (c) command start circuit means connected to said mixer circuit means for producing an output command pulse in response to a predetermined signal from said mixer circuit means,
    (d) commutator circuit means having a rotating selec- tor member for successively coupling the remaining of said sources to said mixer circuit,
(e) circuit means for coupling said command pulse to said commutator circuit means for actuating said selector member, and
(f) transmitter means being coupled to the output of said mixer means for transmitting the information received from said multiple sources.

3. In a commanded multiplexing telemetering system, the combination comprising:
(a) multiple sources of signals containing information to be transmitted,
(b) mixer circuit means comprising a vacuum tube the control grid of which has one of said sources continuously coupled as an input,
(c) command start circuit means connected to the output of said mixer circuit means for producing an output command pulse in response to a predetermined signal from said mixer circuit,
(d) commutator circuit means having a rotating selector member for successively coupling the remainder of said sources to the grid of said tube,
(e) circuit means for coupling said command pulse to said commutator circuit means for actuating said selector member, and
(f) transmitter means being coupled to the output of said mixer means for transmitting the information received from said multiple sources.

4. In a commanded multiplexing telemetering system, the combination comprising:
(a) multiple sources of signals containing information to be transmitted,
(b) a vacuum triode tube,
(c) the grid of said tube having one of said sources continuously coupled thereto in series with a first adding resistor,
(d) a gas discharge tube having a control grid coupled to the output of said triode tube and having an output,
(e) commutator circuit means having a rotating selector member for successively coupling the remainder of said sources through a second adding resistor to the grid of said triode tube,
(f) circuit means for coupling said command pulse to said commutator circuit means for actuating said selector member, and
(g) transmitter means being coupled to the output of said mixer means for transmitting the information received from said multiple sources.

5. In a commanded multiplexing telemetering system, the combination comprising:
(a) multiple sources of signals containing information to be transmitted,
(b) a vacuum triode tube,
(c) the grid of said tube having one of said sources continuously coupled thereto in series with a first adding resistor,
(d) a gas discharge tube having a control grid coupled to the output of said triode tube and having an output,
(e) commutator circuit means having a rotating selector member and an actuating coil connected to the output of said gas tube for actuating said selector member in response to an output signal from said gas tube when a command pulse is received from said mixer circuit,
(f) circuit means for coupling said command pulse to said commutator circuit means for actuating said selector member, and
(g) transmitter means being coupled to the output of said mixer means for transmitting the information received from said multiple sources.

References Cited by the Examiner
UNITED STATES PATENTS

| | | | |
|---|---|---|---|
| 2,701,354 | 2/1955 | Bennet | 340—183 X |
| 2,753,546 | 7/1956 | Knowles | 340—183 |
| 2,753,547 | 7/1956 | Donath et al. | 340—183 |
| 2,833,862 | 5/1958 | Tolson | 340—183 X |
| 2,906,822 | 9/1959 | Schultheis | 340—183 X |
| 2,910,683 | 10/1959 | Todd | 340—183 X |

NEIL C. READ, *Primary Examiner.*

H. I. PITTS, *Assistant Examiner.*